United States Patent
Ko et al.

(10) Patent No.: US 8,379,903 B2
(45) Date of Patent: Feb. 19, 2013

(54) APPARATUS FOR DRIVING VOICE COIL ACTUATOR OF CAMERA AND METHOD THEREOF

(75) Inventors: Min-Joung Ko, Seoul (KR); Jin Park, Seoul (KR); Jung Hyun Lee, Seoul (KR); Seung-Kwon Lee, Seoul (KR)

(73) Assignee: Dongwoon Anatech Co., Ltd., Seoul (KR)

( * ) Notice: Subject to any disclaimer, the term of this patent is extended or adjusted under 35 U.S.C. 154(b) by 387 days.

(21) Appl. No.: 12/773,783

(22) Filed: May 4, 2010

(65) Prior Publication Data

US 2011/0158461 A1    Jun. 30, 2011

(30) Foreign Application Priority Data

Dec. 31, 2009  (KR) ........................ 10-2009-0135487

(51) Int. Cl.
*H04R 1/00* (2006.01)
(52) U.S. Cl. ....................................................... 381/400
(58) Field of Classification Search ................... 381/400
See application file for complete search history.

(56) References Cited

U.S. PATENT DOCUMENTS

| 6,016,405 | A | 1/2000 | Watanabe et al. |
| 8,144,417 | B2 * | 3/2012 | Singer et al. .................. 360/75 |

FOREIGN PATENT DOCUMENTS

| JP | 7-115781 A | 5/1995 |
| JP | 7-162732 A | 6/1995 |
| KR | 10-2006-0100314 A | 9/2006 |
| KR | 10-2009-0009481 A | 1/2009 |
| KR | 10-2009-0010685 A | 1/2009 |
| KR | 10-2009-0015706 A | 2/2009 |
| KR | 10-2009-0032824 A | 4/2009 |

* cited by examiner

*Primary Examiner* — Jianchun Qin
(74) *Attorney, Agent, or Firm* — Knobbe Martens Olson & Bear LLP (57) ABSTRACT

An apparatus and a method for driving a voice coil actuator of a camera are disclosed. In the apparatus for driving a voice coil actuator of a camera, when an input shaping execution unit generates a shaping signal using a resonance frequency of the voice coil actuator to output a drive control signal subjected to input shaping, a drive circuit unit controls an operation of the voice coil actuator connected to a rear end according to the drive control signal using the shaping signal as an initial input. The shaping signal is used for removing resonance of the voice coil actuator and may be one of a 2-step shaping signal, a multi-step shaping signal having 4 or more steps, a linear shaping signal, a toggle shaping signal and the like.

17 Claims, 7 Drawing Sheets

APPARATUS FOR DRIVING VOICE COIL ACTUATOR OF CAMERA AND METHOD THEREOF

CROSS-REFERENCE TO RELATED APPLICATION

This application claims priority to Korean Patent Application No. 10-2009-135487, filed on Dec. 31, 2009, and all the benefits accruing therefrom under 35 U.S.C. §119, the contents of which in its entirety are herein incorporated by reference.

BACKGROUND

1. Field

Exemplary embodiments relate to a voice coil actuator (VCA), and more particularly to an apparatus and a method for driving a voice coil actuator of a camera.

2. Description of the Related Art

A camera module commonly used for a mobile device such as a cellular phone is provided with a voice coil actuator and moves a lens by driving the voice coil actuator to change its position, thereby performing autofocusing on a particular object.

The voice coil actuator is a motor that is developed based on the fact that a vibration plate of a speaker moves back and forth when a force caused by the Fleming's left hand rule between a voice current flowing through a voice coil of the speaker and a magnetic force produced by a permanent magnet. As compared with a DC motor or a stepping motor which rotates, since the voice coil actuator reciprocates linearly over a short distance, it can be widely used for precise tracking or focusing.

The above-mentioned voice coil actuator includes a large coil (L; inductor) component. However, the inductor (L) component of the voice coil actuator exhibits high resonance response characteristics due to its own resonance frequency and causes a ringing phenomenon during operation, so that there are problems in that an autofocus function of the camera may be affected or a malfunction is caused.

SUMMARY

According to an aspect of the invention, there are provided an apparatus and a method for driving a voice coil actuator of a camera, capable of controlling undesirable vibration by reducing high resonance response characteristics of the voice coil actuator to solve a malfunction of the voice coil actuator, and implementing an autofocus function without vibration, thereby improving utilization of a camera and efficiency of the autofocus function.

According to an exemplary embodiment, there is provided an apparatus for driving a voice coil actuator of a camera, including: an input shaping execution unit which converts an initial input of a drive control signal by executing input shaping using a resonance frequency of the voice coil actuator; and a drive circuit unit which controls an operation of the voice coil actuator connected to a rear end by the drive control signal subjected to the input shaping provided from the input shaping execution unit.

Further, the input shaping execution unit may include: a digital-analog converter which receives a digital input code and converts the digital input code into an analog drive signal so as to be outputted; an input shaper which receives the resonance frequency of the voice coil actuator and generates a shaping signal using the resonance frequency; and an operator which generates the drive control signal using the shaping signal as an initial input by multiplying the analog drive signal provided from the digital-analog converter by the shaping signal provided from the input shaper.

Furthermore, the input shaping execution unit may generate a 2-step shaping signal of which a magnitude is changed by dividing a magnitude of a signal corresponding to a target position into two steps and delay a phase by 180° in each step so as to be outputted.

Furthermore, the input shaping execution unit may generate a multi-step shaping signal of which a magnitude is sequentially changed by dividing a magnitude of a signal corresponding to a target position into N steps, with N being a natural number equal to or greater than 4, and delay a phase by 360°/N in each step so as to be outputted.

Furthermore, the input shaping execution unit may execute shaping by generating the shaping signal to have 16 or more steps so that the initial input of the drive control signal has linear characteristics.

Furthermore, the input shaping execution unit may generate a toggle shaping signal which reaches a target position after reciprocating between a start position and the target position one or more times.

Furthermore, the input shaping execution unit may generate the shaping signal for converting the initial input of the drive control signal by convoluting first and second reference signals. The first and second reference signals may be one of a 2-step shaping signal, a multi-step shaping signal having between 4 and 16 steps, a linear shaping signal having 16 or more steps, a toggle shaping signal and the like.

According to another exemplary embodiment, there is provided a method for driving a voice coil actuator of a camera including: a converting process of receiving a digital input code and converting the digital input code into an analog drive signal so as to be outputted; an input shaping process of generating a shaping signal for converting an initial input of a drive control signal by executing input shaping using a resonance frequency of the voice coil actuator; a drive control process of generating the drive control signal using the shaping signal as the initial input by multiplying the analog drive signal by the shaping signal; and a driving process of controlling an operation of the voice coil actuator connected to a rear end according to the drive control signal.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements. The shape, size and regions, and the like, of the drawing may be exaggerated for clarity.

Hereinafter, an apparatus and a method for driving a voice coil actuator coil according to exemplary embodiments will be described in detail with reference to the accompanying drawings.

Figure 1:
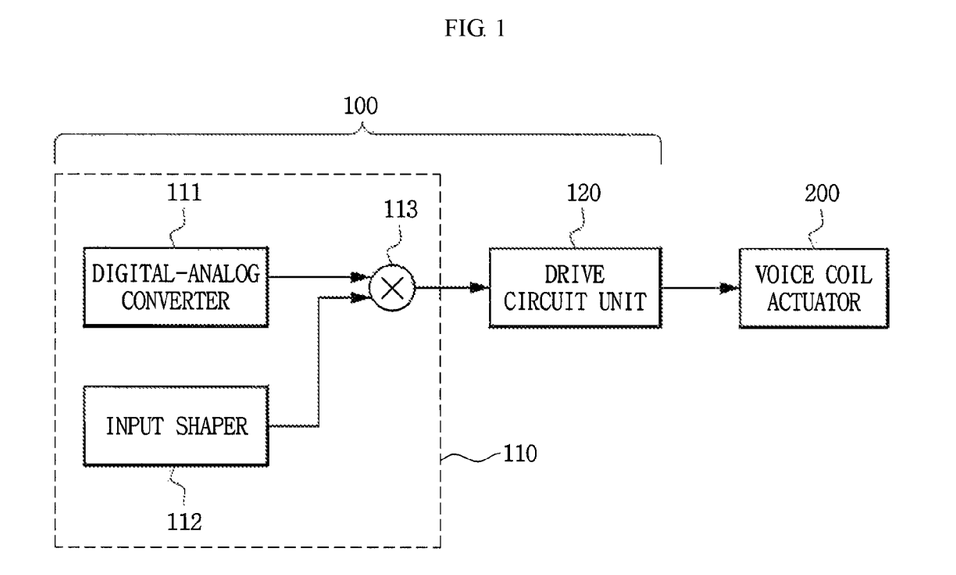
FIG. 1 is a diagram illustrating an apparatus for driving a voice coil actuator of a camera according to an exemplary embodiment.

FIG. 1 is a diagram illustrating an apparatus for driving a voice coil actuator of a camera according to an exemplary embodiment.

An apparatus 100 for driving a voice coil actuator is based on an input shaping technique using a unique resonance frequency of a voice coil actuator 200 in order to reduce high resonance response characteristics of the voice coil actuator 200, and thus reduces a ringing phenomenon of the voice coil actuator 200 mounted in the camera so as to stably drive the voice coil actuator 200 without a malfunction. Accordingly, accurate autofocusing may be achieved.

Referring to FIG. 1, the voice coil actuator driving apparatus 100 used for driving the voice coil actuator 200 may include an input shaping execution unit 110 and a drive circuit unit 120.

The input shaping execution unit 110 executes input shaping using the resonance frequency of the voice coil actuator 200 to convert an initial input of a drive control signal and effectively remove resonance of the voice coil actuator 200 through this conversion. In an exemplary embodiment, the input shaping execution unit 110 may include a digital-analog converter 111, an input shaper 112, and an operator 113.

The digital-analog converter 110 receives a digital input code and converts the received digital input code into an analog drive signal so as to be outputted.

The input shaper 120 receives the resonance frequency of the voice coil actuator 200 and generates a shaping signal using the received resonance frequency so as to be outputted.

The operator 113 generates the drive control signal subjected to the input shaping so as to remove the resonance of the voice coil actuator 200 by multiplying an input generated through the digital-analog converter 111 by an input generated through the input shaping execution unit 110. That is, the operator 113 generates the drive control signal which uses the shaping signal as an initial input by multiplying the analog drive signal provided from the digital-analog converter 111 by the shaping signal provided from the input shaping execution unit 110 and transmits the generated drive control signal to the drive circuit unit 120.

The drive circuit unit 120 receives the drive control signal using the shaping signal as the initial input from the input shaping execution unit 110, and generates the drive signal for controlling an operation of the voice coil actuator 200 connected to a rear end in response to the drive control signal subjected to the input shaping.

For example, the digital-analog converter 111 receives position information (digital input code) on a lens module for autofocusing and outputs an analog voltage (an analog drive signal, or a drive control signal that is not subjected to shaping) according to a bit combination of corresponding codes, and the input shaping execution unit 110 provides the shaping signal for converting an initial input of the analog voltage. Then, the voltage subjected to the input shaping (the shaped drive control signal) is output by the operator 113, and the drive circuit unit 120 provides a drive current (drive signal) suitable for driving the voice coil actuator 200 using the voltage subjected to the input shaping.

The voice coil actuator 200 moves the lens module of the camera vertically. For example, the voice coil actuator 200 includes a lower leaf spring, an upper leaf spring, a lower spring mold, and an upper spring mold for stopping a vertical movement of the lens module and limiting the movement thereof, and additionally includes a yoke for forming a path of a magnetic field formed by the inductor (L), a bobbin for forming a magnetic field by a current, and the like. The voice coil actuator 200 vertically moves a screwed member of a focus male thread of the lens module and a focus female thread of the lens module along the magnetic field formed by the bobbin, which is a magnetic field generator, and the magnetic path formed by the yoke, by the drive signal of the drive circuit unit 120 which controls the current for driving the actuator. The voice coil actuator driving apparatus 100 as illustrated in FIG. 1 executes the input shaping on the applied signal and thus solves the ringing phenomenon during the autofocusing, thereby effectively removing the resonance of the voice coil actuator 200.

FIGS. 2A to 2D are waveform diagrams for explaining an operation of the input shaping execution unit according to exemplary embodiments and illustrate generation of an N-step shaping signal wherein N is a natural number equal to or greater than 2.

A basic input shaping technique is to apply an initial input to the voice coil actuator 200 and give vibration of a phase opposite to the initial input after a predetermined time delay. The input shaping execution unit 110 implements the input shaping technique for making residual vibration of the voice coil actuator 200 zero (0). When the shaping signal is applied, vibration may be removed by applying vibration reversely to the generated vibration using the vibration removal principle. The input shaping execution unit 110 generates input shaping with its own resonance frequency and reduces vibration of the voice coil actuator 200 by operating the drive circuit unit 120 accordingly. When the vibration due to the initial input and the vibration of the reversed phase with regard to the vibration due to the initial input are given to the voice coil actuator 200 after the predetermined time delay, it is possible to reduce vibration of the voice coil actuator 200 during the movement or the stopping of the voice coil actuator 200.

In an exemplary embodiment, the input shaping execution unit 110 designates an amplitude of the drive control signal which is a reference signal as a target position, and an N-step shaping signal of which a magnitude is sequentially changed step by step by distributing the magnitude of the signal corresponding to the target position into N steps (N is a natural number equal to or greater than 2) is generated. The phase of the shaping signal is delayed by 360°/N in each step so as to be outputted.

Figure 2A:
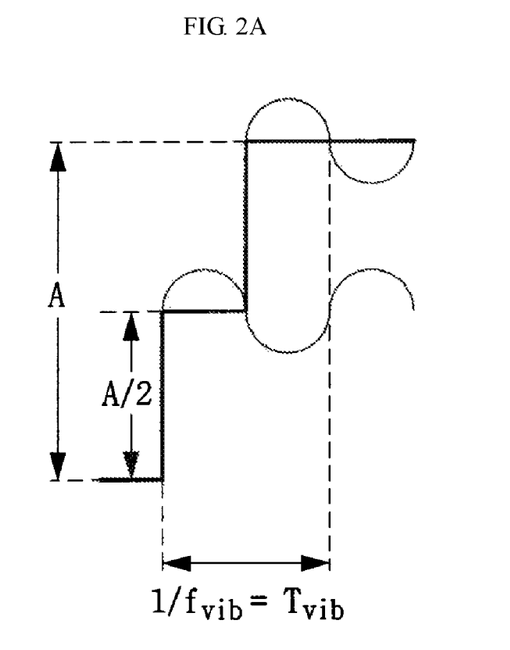
FIGS. 2A to 2D are waveform diagrams for explaining an operation of an input shaping execution unit according to exemplary embodiments.
Figure 2B:
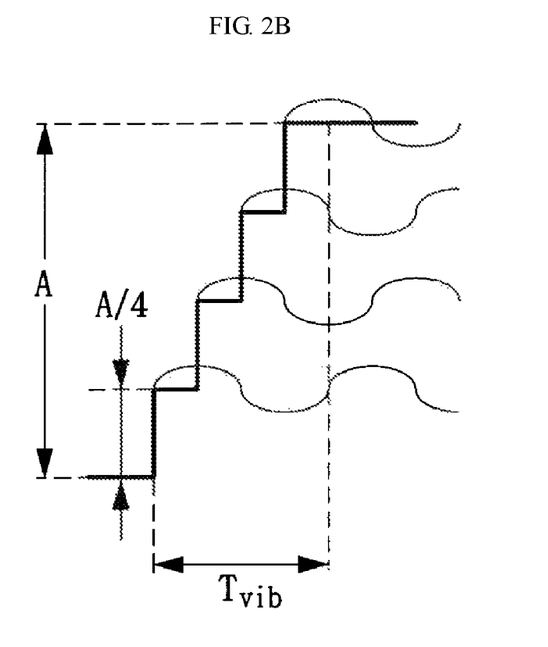
Figure 2C:
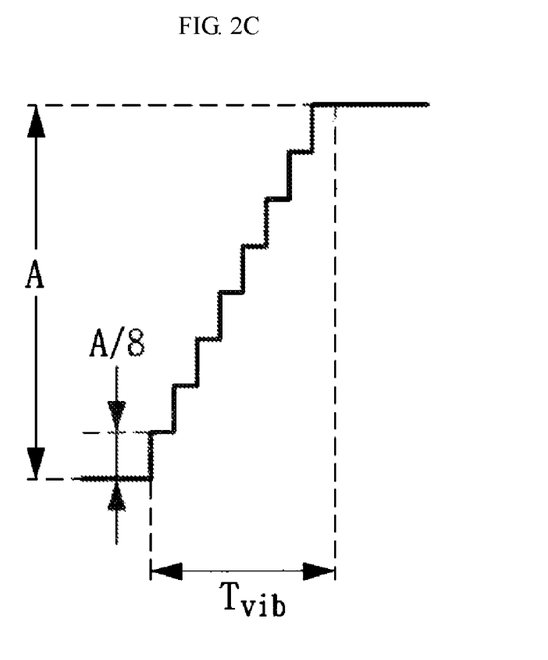
Figure 2D:
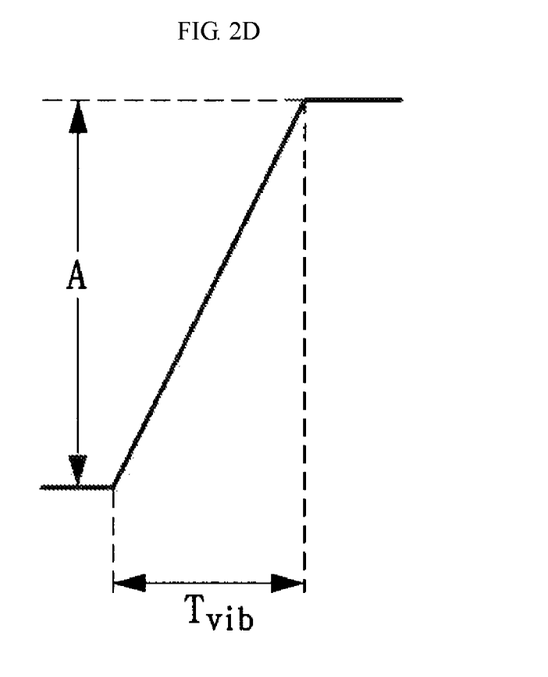

FIG. 2A illustrates a 2-step shaping signal, FIGS. 2B and 2C illustrate multi-step shaping signals having four or more steps, and FIG. 2D illustrates a linear shaping signal obtained by expanding N to 16 or more steps. As illustrated in FIG. 2A, when the 2-step shaping signal is input to the voice coil actuator 200 using the input shaping technique, vibration can be removed to some extent, and this may be extended to the concepts illustrated in FIGS. 2B and 2C.

When the resonance period of the voice coil actuator 200 is $T_{vib}$, the input shaping execution unit 110 executes the input shaping by sequentially applying the steps of the N-step shaping signal for $T_{vib}/N$ in each step to allow the magnitude of the N-step shaping signal of the voice coil actuator 200 to reach the target position by the sequential application in the steps. As the number of steps is increased, a signal magnitude in each step is reduced, and phases of the steps are distributed to have a resonance period in which waveforms of the signals of the N steps are cancelled.

In FIGS. 2A, 2B and 2C, N is 2, 4 and 8, respectively, and when the target position of the drive control signal is A, the magnitude of the step signal is A/2, A/4, and A/8, respectively.

In the case of FIG. 2A, the input shaping execution unit 110 divides the magnitude of the signal corresponding to the target position into two steps to generate the 2-step shaping signal of which the magnitude is changed and delays a phase thereof by 180° in each step so as to be outputted. Specifically, after applying a first step signal, the input shaping execution unit 110 applies a second step signal with a phase delayed by 180° therefrom.

In the 2-step shaping signal illustrated in FIG. 2A, the input shaping execution unit 110 generates vibration having a phase reverse to that of vibration of the first step signal applied first using the second step signal to solve the ringing phenomenon that may occur until the target position is reached, thereby suppressing the vibration of the voice coil actuator 200. That is, the vibration of the initial input of the voice coil actuator 200 and the vibration after a predetermined time delay for the initial input are cancelled to suppress the vibration. The vibration of the voice coil actuator 200 which has its own resonance frequency is removed by inputting a waveform having a phase delayed by 180° to the voice coil actuator. Vibration occurs until the first step signal moves to a half position A/2 of the target position A, and the vibration is cancelled as the second step signal moves having a phase reverse to that of the first step signal moves to the target position A.

FIGS. 2B to 2D extend the principle illustrated in FIG. 2A to a multi-step type and a linear type.

The input shaping execution unit 110 generates a multi-step shaping signal of which a magnitude is sequentially changed by distributing the magnitude of the signal corresponding to the target position into N steps, with N being a natural number equal to or greater than 4, and delays the phase by 360°/N in each step so as to be outputted. In the case of the 4-step shaping signal illustrated in FIG. 2B, phases changes of 0°, 90°, 180°, and 270° occurs in first, second, third, and fourth step signals. FIG. 2C illustrates an 8-step shaping signal. Since the magnitude of each step is reduced when the multi-step method or the linear method is applied, ringing that may occur when a frequency of a shaping signal is misaligned with the resonance frequency of the voice coil actuator 200 can be reduced. The input shaping method of dividing the shaping signal into steps may be extended to the shaping signal having linearity as illustrated in FIG. 2D.

Figure 3:
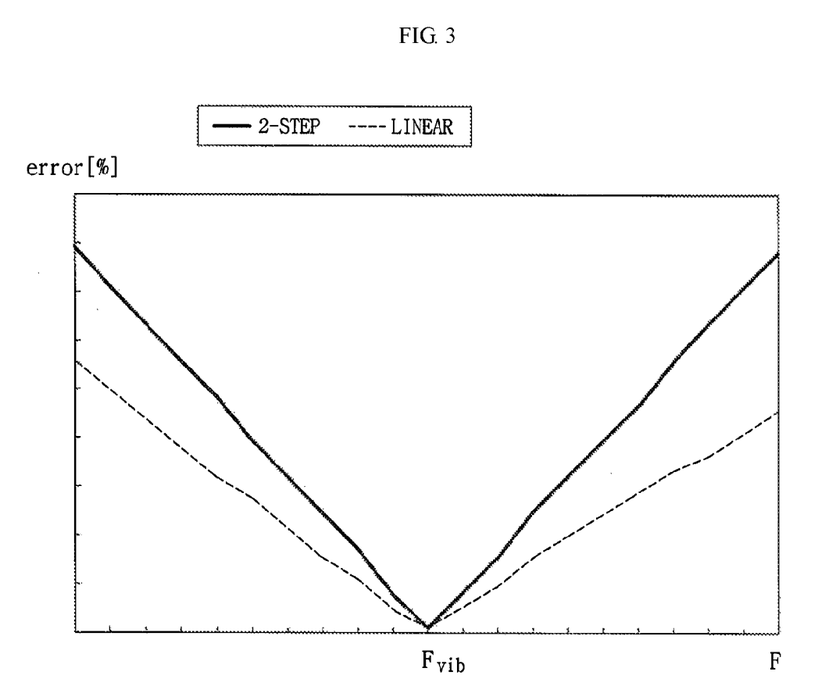
FIG. 3 is a graph for explaining the effect of FIGS. 2A to 2D.

FIG. 3 is a graph for explaining the effect of FIGS. 2A to 2D and shows that the ringing phenomenon is reduced by a linear method as compared with the 2-step method.

Better ringing characteristics are obtained in the order of linear >8-step>4-step>2-step as the steps of the shaping signal with stepped input are changed. That is, as the number of steps of the shaping signal is increased, the magnitude of each sine wave is reduced due to the resonance of the step signal. Therefore, even when there is an error in the input shaping process, ringing is less likely to occur.

When the input shaping using the linear method is executed, the input shaping execution unit 110 executes shaping to allow the initial input of the drive control signal to have linear characteristics as illustrated in FIG. 2D by dividing the shaping signal into 16 or more steps.

Particularly, in the case of the linear method illustrated in FIG. 2D, an error ratio of the linear-type shaping signal due to the vibration has a very small value even when the signal deviates from a resonance period. Thus, resonance can be cancelled by executing the input shaping using the linear method corresponding to the resonance period.

Referring to the graph of frequency (F) vs. error illustrated in FIG. 3, an error curve in the linear method is lower and closer to 0 than that of the 2-step method, and thus it can be seen that the linear method has better error characteristics than the 2-step method. The linear method shows a small error ratio even when the signal deviates from the resonance period and is less likely to cause ringing as compared with the 2-step method.

Since the magnitude of each step is reduced when the multi-step method or the linear method is applied, ringing that may occur when a frequency of a shaping signal is misaligned with the resonance frequency of the voice coil actuator 200 can be reduced.

For example, the input shaping execution unit 110 generates a shaping signal having the same frequency as the resonance frequency $F_{vib}$ ($1/T_{vib}$) of the voice coil actuator 200 to remove the ringing phenomenon. When the unique resonance frequency $F_{vib}$ of the voice coil actuator 200 is aligned with the frequency of the shaping signal, vibration does not occur. If the frequency of the shaping signal deviates from the unique resonance frequency $F_{vib}$ of the voice coil actuator 200 and an error occurs, the linear method shows a smaller error ratio than that of the 2-step method, and magnitude of the generated vibration is smaller.

Figure 4:
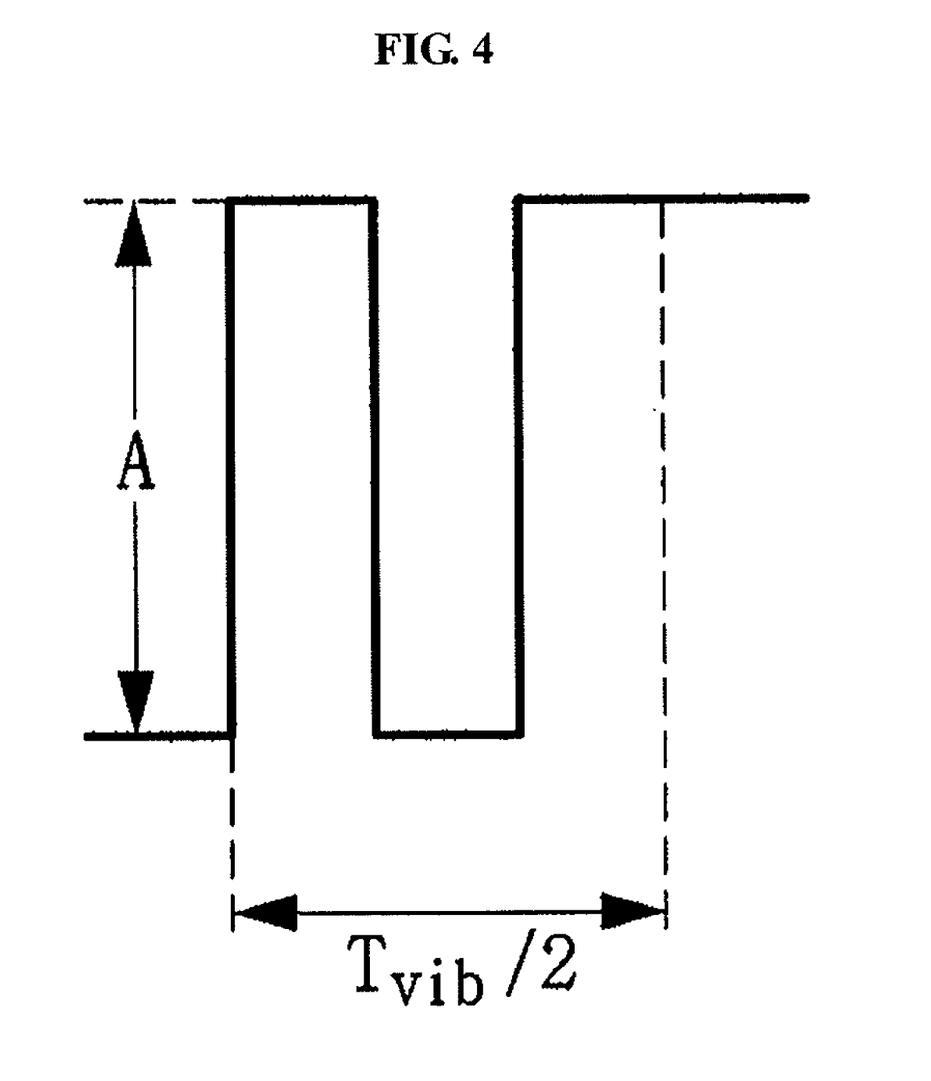
FIG. 4 is a waveform diagram for explaining an operation of an input shaping execution unit according to another exemplary embodiment.

FIG. 4 is a waveform diagram for explaining an operation of the input shaping execution unit according to another exemplary embodiment.

In this embodiment, the input shaping execution unit 110 generates a toggle shaping signal which reaches a target position after reciprocating between a start position and the target position one or more times during input shaping so as to be outputted. When the toggle shaping signal as illustrated in FIG. 4 is applied, the vibration of the voice coil actuator 200 can be cancelled to reach the target position within a shorter time as compared with a case where the input shaping is not used. Since fractional signals cause cancelling effects with each other, a ringing reduction effect can be obtained as compared with a case where the drive control signal is applied to the target position without the input shaping.

Figure 5:
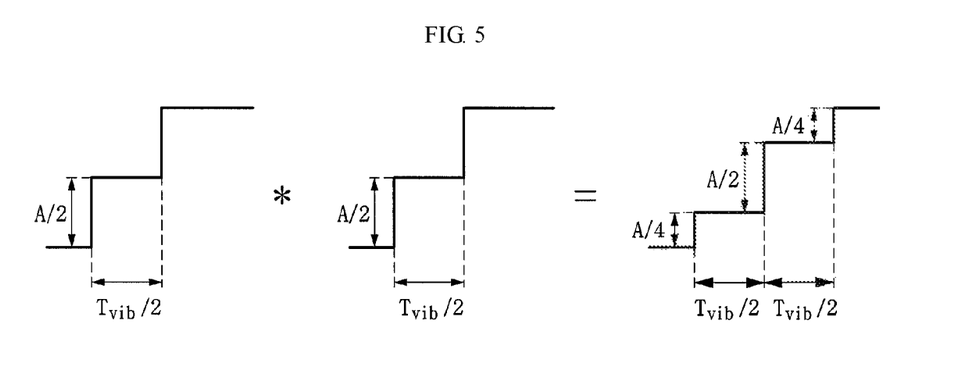
FIG. 5 is a waveform diagram for explaining an operation of an input shaping execution unit according to still another exemplary embodiment.

FIG. 5 is a waveform diagram for explaining an operation of the input shaping execution unit according to still another exemplary embodiment.

The input shaping execution unit 110 generates a shaping signal for converting the initial input of the drive control signal by convoluting first and second reference signals to remove the resonance of the voice coil actuator 200. FIG. 5 illustrates a case of generating a new-type shaping signal as illustrated in FIG. 5 (c) by convoluting a shaping signal illustrated in FIG. 5 (a) with a shaping signal illustrated in FIG. 5 (b). When the two 2-step shaping signals illustrated in FIGS. 5 (a) and (b), in which each step is applied for $T_{vib}/2$ and the magnitude of the signal in each step is increased by A/2, are convoluted, the convolution-type shaping signal of which a period and a magnitude for each step are changed as illustrated in FIG. 5 (c) can be obtained.

As described above, the input shaping execution unit 110 may generate various input waveforms through convolution in order to reduce ringing of the voice coil actuator 200 in the camera. An input generated by the convolution is obtained by convoluting the above-mentioned shaping signals, for example, 2-step shaping signal, multi-step signal having between 4 and 16 steps, linear shaping signal having 16 or more steps, toggle shaping signal, and the like, and may have various shapes depending a convolution method.

Figure 6:
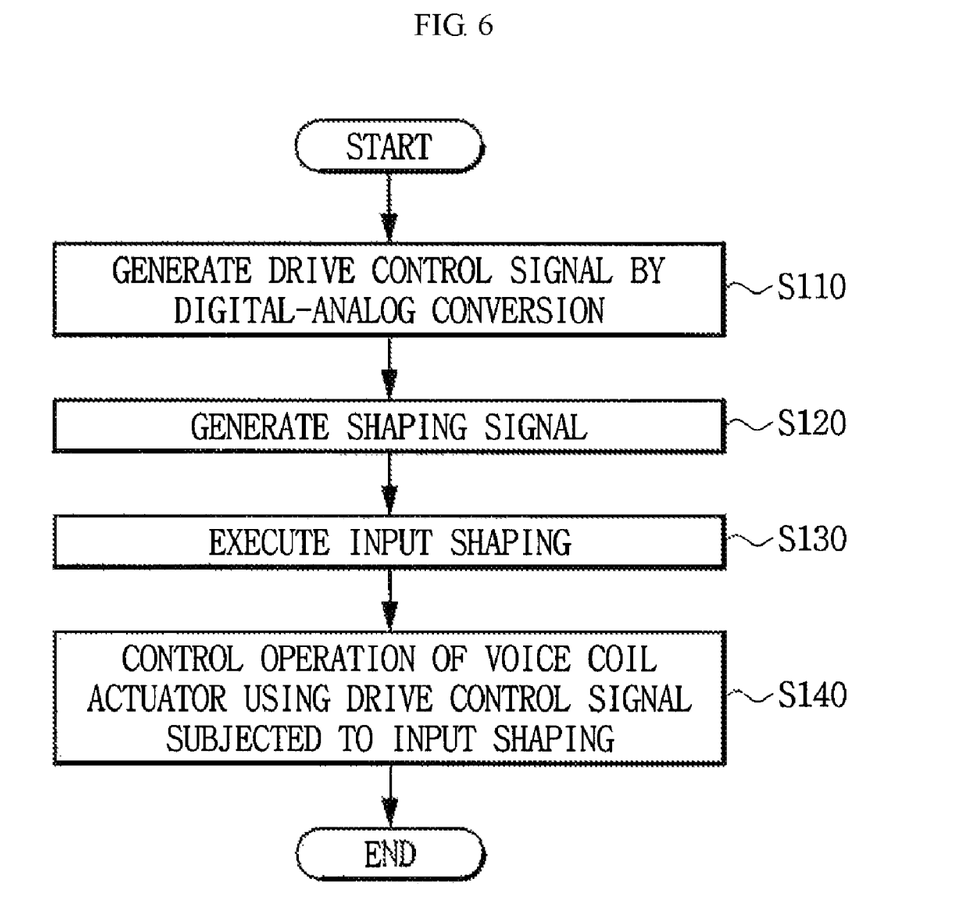
FIG. 6 is a flowchart of a method for driving a voice coil actuator of a camera according to an exemplary embodiment.

FIG. 6 is a flowchart of a method for driving a voice coil actuator of a camera according to an exemplary embodiment.

In the voice coil actuator driving apparatus 100, the digital-analog converter 111 receives a digital input code from the outside and converts it into an analog drive signal so as to be outputted to the operator 113 (S110).

The input shaping execution unit 110 generates a shaping signal for converting an initial input of a drive control signal by executing input shaping using a unique resonance frequency of the voice coil actuator (S120). Here, the shaping signal for executing the input shaping on the drive control signal may be the 2-step shaping signal as illustrated in FIG. 2A or the stepped multi-step shaping signal in which a magnitude is sequentially changed in steps and a phase of the signal is delayed by 360°/N in each step as illustrated in FIGS. 2B and 2C. Otherwise, the shaping signal may be the linear shaping signal having linear characteristics as illustrated in FIG. 2D or the toggle shaping signal that reaches a target position after reciprocating between a start position and the target position one or more times as illustrated in FIG. 4. Alternatively, the shaping signal may be a signal obtained by convoluting reference signals, wherein pure shaping signals such as the multi-step shaping signals having 2 or 4 or more steps, the linear shaping signal, and the toggle shaping signal are used as the reference signals.

The operator 113 generates a drive control signal which is subjected to the input shaping using the shaping signal as an initial input by multiplying the analog drive signal input from the digital-analog converter 111 by the shaping signal of the input shaping execution unit 110 (S130).

The drive circuit unit 120 that receives the drive control signal subjected to the input shaping controls an operation of the voice coil actuator 200 connected to a rear end by executing an operation such as level shift or current supply on the basis of the received drive control signal.

According to exemplary embodiments of the invention, it is possible to control undesirable vibration by reducing high resonance response characteristics of the voice coil actuator to solve a malfunction of the voice coil actuator, and an autofocus function may be implemented without vibration, thereby improving utilization of the camera and efficiency of the autofocus function.

While the exemplary embodiments have been shown and described, it will be understood by those skilled in the art that various changes in form and details may be made thereto without departing from the spirit and scope of this disclosure as defined by the appended claims.

In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

What is claimed is:

1. An apparatus for driving a voice coil actuator of a camera, comprising:
   an input shaping execution unit which converts an initial input of a drive control signal by executing input shaping using a resonance frequency of the voice coil actuator and a shaping signal; and
   a drive circuit unit which controls an operation of the voice coil actuator connected to the drive circuit unit by the drive control signal subjected to the input shaping provided from the input shaping execution unit,
   wherein the shaping signal is one of a 2-step shaping signal, a multi-step shaping signal having between 4 and 16 steps, a linear shaping signal having 16 or more steps, and a toggle shaping signal.

2. The apparatus according to claim 1, wherein the input shaping execution unit comprises:
   a digital-analog converter which receives a digital input code and converts the digital input code into an analog drive signal so as to be outputted;
   an input shaper which receives the resonance frequency of the voice coil actuator and generates the shaping signal using the resonance frequency; and
   an operator which generates the drive control signal using the shaping signal as an initial input by multiplying the analog drive signal provided from the digital-analog converter by the shaping signal provided from the input shaper.

3. The apparatus according to claim 1, wherein the input shaping execution unit generates a 2-step shaping signal of which a magnitude is changed by dividing a magnitude of a signal corresponding to a target position into two steps and delays a phase by 180° in each step so as to be outputted.

4. The apparatus according to claim 1, wherein the input shaping execution unit generates a multi-step shaping signal of which a magnitude is sequentially changed by dividing a magnitude of a signal corresponding to a target position into N steps, with N being a natural number equal to or greater than 4, and delays a phase by 360°/N in each step so as to be outputted.

5. The apparatus according to claim 4, wherein, assuming that the resonance period of the voice coil actuator is $T_{vib}$, the input shaping execution unit sequentially applies the steps of the multi-step shaping signal for $T_{vib}/N$ in each step, and allows the magnitude of the multi-step shaping signal to reach the target position within the resonance period $T_{vib}$ of the voice coil actuator through the sequential applications in the steps.

6. The apparatus according to claim 4, wherein the input shaping execution unit reduces the magnitude of the signal in each step as the number of steps is increased.

7. The apparatus according to claim 4, wherein the input shaping execution unit distributes the phase in each step to have such a resonance period that waveforms of the signals in N steps are cancelled.

8. The apparatus according to claim 4, wherein the input shaping execution unit executes shaping by generating the shaping signal to have 16 or more steps so that the initial input of the drive control signal has linear characteristics.

9. The apparatus according to claim 1, wherein the input shaping execution unit generates a toggle shaping signal which reaches a target position after reciprocating between a start position and the target position one or more times.

10. The apparatus according to claim 1, wherein the input shaping execution unit generates the shaping signal for converting the initial input of the drive control signal by convoluting first and second reference signals.

11. The apparatus according to claim 10, wherein the first and second reference signals are one of a 2-step shaping signal, a multi-step shaping signal having between 4 and 16 steps, a linear shaping signal having 16 or more steps, and a toggle shaping signal.

12. A method for driving a voice coil actuator of a camera comprising:
   a converting process of receiving a digital input code and converting the digital input code into an analog drive signal so as to be outputted;
   an input shaping process of generating a shaping signal for converting an initial input of a drive control signal by executing input shaping using a resonance frequency of the voice coil actuator;
   a drive control process of generating the drive control signal using the shaping signal as the initial input by multiplying the analog drive signal by the shaping signal; and
   a driving process of controlling an operation of the voice coil actuator according to the drive control signal,
   wherein the shaping signal is one of a 2-step shaping signal, a multi-step shaping signal having between 4 and 16 steps, a linear shaping signal having 16 or more steps, and a toggle shaping signal.

13. The method according to claim 12, wherein, in the input shaping process, the shaping signal is a 2-step shaping signal in which a magnitude of a signal is changed in 2 steps and a phase of the signal is delayed by 180° in the second step from the first step.

14. The method according to claim 12, wherein, in the input shaping process, the shaping signal is a multi-step shaping signal in which a magnitude is sequentially changed in N steps, with N being a natural number equal to or greater than 4, and a phase of the signal is delayed by 360°/N in each step.

15. The method according to claim 14, wherein the shaping signal is a linear shaping signal having linear characteristics and 16 or more steps.

16. The method according to claim 12, wherein, in the input shaping process, the shaping signal is a toggle shaping signal which reaches a target position after reciprocating between a start position and the target position one or more times.

17. The method according to claim 12, wherein, in the input shaping process, the shaping signal is a signal obtained by convoluting first and second reference signals, and the first and second reference signals are one of a 2-step shaping signal, a multi-step shaping signal having between 4 and 16 steps, a linear shaping signal having 16 or more steps, and a toggle shaping signal.

* * * * *